(12) United States Patent
Heim

(10) Patent No.: US 6,353,515 B1
(45) Date of Patent: Mar. 5, 2002

(54) FLEX SUSPENSION ASSEMBLY FOR DISK DRIVE

(75) Inventor: Matthew R. Heim, Ventura, CA (US)

(73) Assignee: Innovex, Inc., Maple Plain, MN (US)

( * ) Notice: Subject to any disclaimer, the term of this patent is extended or adjusted under 35 U.S.C. 154(b) by 0 days.

(21) Appl. No.: 09/664,256

(22) Filed: Sep. 18, 2000

Related U.S. Application Data

(60) Provisional application No. 60/154,878, filed on Sep. 20, 1999.

(51) Int. Cl.[7] .................................................. G11B 5/48
(52) U.S. Cl. .................................................. 360/245.9
(58) Field of Search ........................ 360/245.9, 245.8, 360/244.3, 244.2, 244.9; 29/603.03, 603.06

(56) References Cited

U.S. PATENT DOCUMENTS

| | | | |
|---|---|---|---|
| 4,734,805 A |   | 3/1988 | Yamada et al. ............... 360/104 |
| 4,819,094 A |   | 4/1989 | Oberg ........................ 360/104 |
| 5,001,583 A | * | 3/1991 | Matsuzaki ................... 360/104 |
| 5,006,946 A | * | 4/1991 | Matsuzaki ................... 360/104 |
| 5,187,625 A | * | 2/1993 | Blaeser et al. .............. 360/104 |
| 5,491,597 A | * | 2/1996 | Bennin et al. ............... 360/104 |
| 5,606,477 A |   | 2/1997 | Erpelding et al. ........... 360/104 |
| 5,623,758 A |   | 4/1997 | Brooks, Jr. et al. ....... 29/603.01 |
| 5,645,735 A | * | 7/1997 | Bennin et al. ................. 216/22 |
| 5,771,135 A | * | 6/1998 | Ruiz et al. .................. 360/104 |
| 5,862,017 A | * | 1/1999 | Kohira et al. ............... 360/104 |
| 5,864,445 A | * | 1/1999 | Bennin et al. ............... 360/104 |
| 5,883,759 A | * | 3/1999 | Schulz ....................... 360/104 |
| 6,005,750 A | * | 12/1999 | Willard et al. .............. 360/104 |
| 6,154,343 A | * | 11/2000 | Khan et al. ................ 360/245.9 |

FOREIGN PATENT DOCUMENTS

| | | | |
|---|---|---|---|
| EP | 0 121 057 A1 | 10/1984 | ............ G11B/5/54 |
| GB | 2 193 833 A | * 2/1988 | |
| JP | 6-349035 | * 12/1994 | |

OTHER PUBLICATIONS

A copy of PCT International Search Report for International Application No. PCT/US00/40950 mailed on Feb. 21, 2001 (7 pages).

* cited by examiner

*Primary Examiner*—William Klimowicz
(74) *Attorney, Agent, or Firm*—Dicke, Billig & Czaja, P.A.

(57) ABSTRACT

A flex suspension assembly is attachable to an actuator arm in a disk drive and includes a suspension assembly adapted to resiliently support a transducer head in the disk drive, and a flex cable having a flexible sleeve and conductors disposed in top of the flexible sleeve adapted to provide a path for electrical signals transmitted to and from the transducer head. A dampening adhesive is applied between the flex cable and the suspension assembly in a dampening adhesive area defined by dampening adhesive control features that bound continuous contact between the flex cable and the suspension assembly. The dampening adhesive has a low modulus of elasticity to provide structural dampening to the flex suspension assembly. In one embodiment, the dampening adhesive provides structural dampening to the flex suspension assembly to significantly reduce first torsion and second torsion vibration mode gains of the flex suspension assembly.

19 Claims, 6 Drawing Sheets

FLEX SUSPENSION ASSEMBLY FOR DISK DRIVE

CROSS REFERENCE TO RELATED APPLICATIONS

This Non-Provisional Utility Patent Application claims the benefit of the filing date of U.S. Provisional Application Serial No. 60/154,878, filed Sep. 20, 1999, entitled "FLEX SUSPENSION ASSEMBLY FOR DISK DRIVE."

THE FIELD OF THE INVENTION

The present invention generally relates to a suspension assembly for a disk drive, and more particularly to a flex suspension assembly having a flex cable attached to a suspension assembly for transmitting electrical signals between a transducer and control circuitry in the disk drive.

BACKGROUND OF THE INVENTION

A hard disk drive includes a suspension assembly for supporting a transducer head relative to a rotating magnetic disk. The transducer head includes a slider supporting at least one transducer, such as an inductive transducer, a magnetoresistance (MR) transducer, or giant magnetoresistance (GMR) transducer. The transducer head can include separate read and write transducers or one read/write transducer. The transducer communicates with the disk surface to write data to and read data from the disk.

The suspension assembly includes a flexure or gimble connecting the slider to the suspension assembly. The flexure resiliently supports the slider and allows the slider to move vertically and to pitch and roll about a pivot while the slider follows the topography of the rotating disk. The slider includes a hydrodynamic air bearing to receive a lifting force from air movement resulting from rotation of the disk. The flexure is rigid in the in-plane directions for maintaining precise in-plane positioning.

The suspension assembly also includes a load beam which acts as a spring supplying a downward force on the transducer head to counteract the hydrodynamic lifting force developed by the air bearing. The load beam is attached to a rigid support arm of an actuator arm. The load beam is typically connected to the support arm by a well-known technique referred to as swaging or ball staking. The load beam is resilient in the vertical direction. The vertical resiliency permits the slider to follow the topography of the disk surface. As with the flexure, the load beam is rigid in the in-plane directions.

Electrical signals are transmitted between control circuitry in the disk drive and the transducer via small conductors. These conductors are typically twisted copper wires or copper traces enclosed in a flex cable. There are typically two conductors, but the number of conductors may vary. In conventional suspension assembly designs, where the suspension assembly employs flex cables, the flex cable is typically attached to the suspension assembly with a structural rigid adhesive, such as a liquid ultra-violet (UV) cure adhesive or a pressure sensitive adhesive.

The suspension assembly including the load beam and flexure; the conductors; and the transducer head including the slider and the transducer together form a head-gimble assembly (HGA).

The suspension assembly's load beam and flexure are typically made from stainless steel. The load beam includes flanges along the sides of the load beam to stiffen the load beam and to raise the resonance frequencies for its first torsion vibration mode and its second torsion vibration mode.

Dampening of the first torsion and second torsion vibration mode gain is typically achieved by the application of a constrained layer dampener. The constrained layer dampener typically comes in the form of a pressure sensitive adhesive on a silicon release liner. The constrained layer dampener is applied by applying pressure and elevating temperature and removing the release liner. The constrained layer dampener is problematic because it is an extra component being added to a suspension assembly in a very cost-competitive hard disk drive market. In addition, the added manufacturing steps to apply the constrained layer dampener with the pressure sensitive adhesive further increase the cost of the disk drive. Moreover, the constrained layer dampeners are typically not as clean as would be desirable, which can cause, among other things, outgassing problems.

For the reasons stated above, a suspension assembly is desired which adequately dampens the first torsion vibration mode and the second torsion vibration mode gains without using a constrained layer dampener.

SUMMARY OF THE INVENTION

The present invention provides a flex suspension assembly attachable to an actuator arm in a disk drive. The flex suspension assembly includes a suspension assembly and a flex cable. The suspension assembly is adapted to resiliently support a transducer head in the disk drive. The flex cable has a flexible sleeve and conductors disposed in top of the flexible sleeve adapted to provide a path for electrical signals transmitted to and from the transducer head. A dampening adhesive is applied between the flex cable and the suspension assembly in at least one dampening adhesive area defined by dampening adhesive control features that bound continuous contact between the flex cable and the suspension assembly. The dampening adhesive has a low modulus of elasticity to provide structural dampening to the flex suspension assembly.

In one embodiment, a structural adhesive is applied between the flex cable and the suspension assembly in at least one structural adhesive area defined by structural adhesive control features that bound continuous contact between the flex cable and the suspension assembly. The structural adhesive has a high modulus of elasticity to provide at least one rigid joint between the flex cable and the suspension assembly in the at least one structural adhesive area.

In one embodiment, the suspension assembly includes a base plate adapted to attach to the actuator arm in the disk drive, a load beam attached to the base plate, and a flexure attached to the load beam and adapted to resiliently support the transducer head.

In one embodiment, the at least one dampening adhesive area is located between the flex cable and the load beam. In one embodiment, a structural adhesive is applied between the flex cable and the flexure in at least one structural adhesive area defined by structural adhesive control features that bound continuous contact between the flex cable and flexure. In one embodiment, the load beam includes a tail tack tab and a structural adhesive is applied between the flex cable and tail tack tab in at least one structural adhesive area defined by structural adhesive control features that bound continuous contact between the flex cable and tail tack tab.

In one embodiment, the flex suspension assembly the dampening adhesive provides structural dampening to the flex suspension assembly in high strain areas.

In one embodiment, the dampening adhesive has a modulus of elasticity in a range from approximately 100,000 pounds per square inch (psi) to approximately 1,000,000 psi. In one embodiment, the structural adhesive has a modulus of elasticity in a range from approximately 1.5 million pounds per square inch (psi) to approximately 2.5 million psi.

One aspect of the present invention provides a method of forming a flex suspension assembly which is attachable to an actuator arm in a disk drive. The method includes providing a suspension assembly adapted to resiliently support a transducer head in the disk drive. The method also includes providing a flex cable having a flexible sleeve and conductors disposed in top of the flexible sleeve adapted to provide a path for electrical signals transmitted to and from the transducer head. The method also includes applying a dampening adhesive between the flex cable and the suspension assembly in at least one dampening adhesive area defined by dampening adhesive control features that bound continuous contact between the flex cable and the suspension assembly. The dampening adhesive having a low modulus of elasticity to provide structural dampening to the flex suspension assembly.

In one embodiment, the dampening adhesive provides structural dampening to the flex suspension assembly to significantly reduce a first torsion vibration mode gain of the flex suspension assembly. In one embodiment, the dampening adhesive provides structural dampening to the flex suspension assembly to significantly reduce a second torsion vibration mode gain of the flex suspension assembly. In these embodiments, the dampening adhesive emulates a conventional constrained layer dampener without actually having a constrained layer dampener added to the flex suspension assembly. The dampening adhesive can provide dampening which is particularly beneficial in disk drives, because a position control system of the disk drive must quickly locate the transducer head above a correct data track and maintain that positioning during operation. Accordingly, one embodiment of a disk drive employing a flex suspension assembly according to the present invention requires minimal first torsion vibration mode gain and second torsion vibration mode gain in the suspension assembly.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
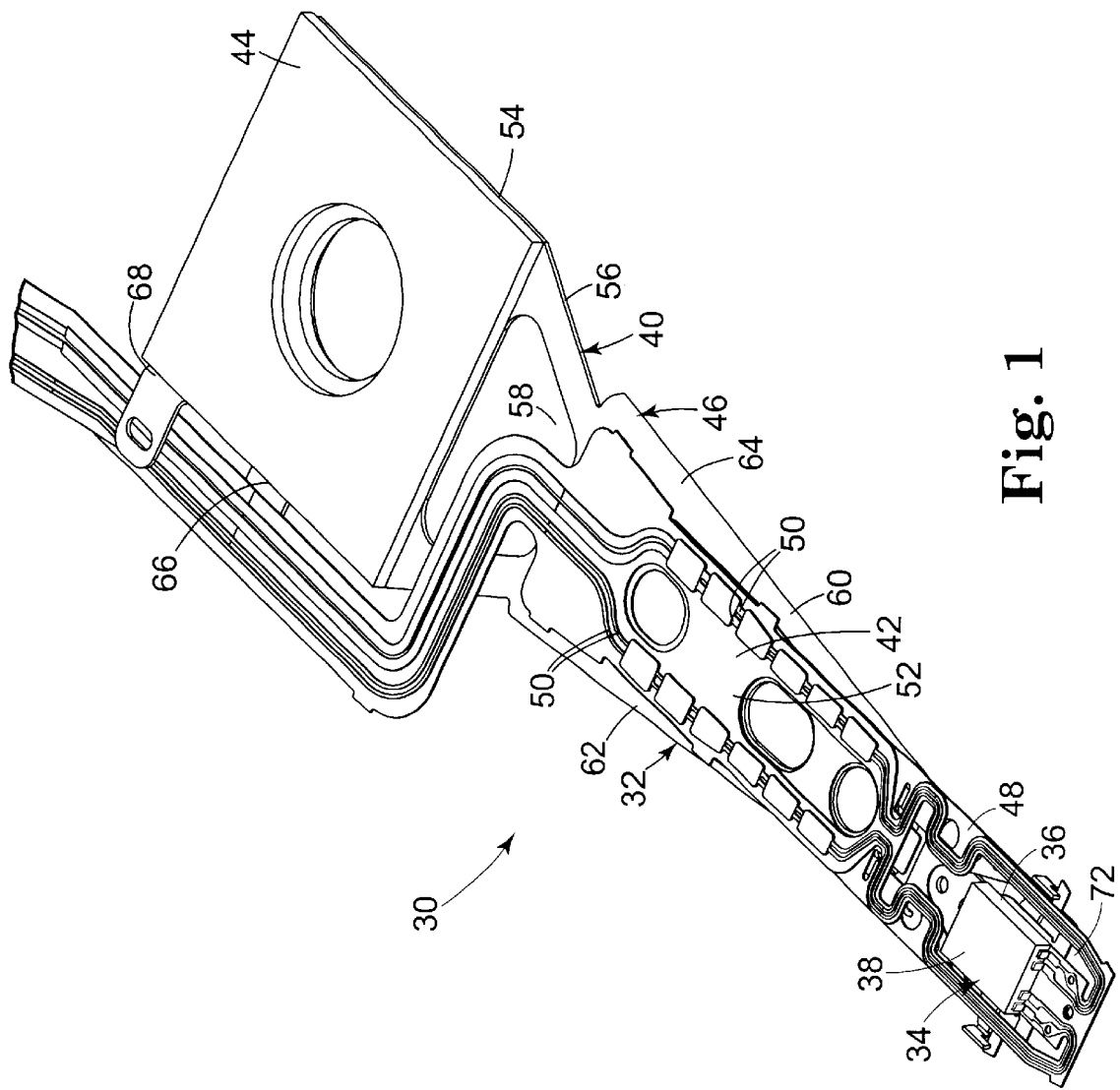
FIG. 1 is a disk side perspective view of a head-gimble assembly (HGA) including a flex suspension assembly according to the present invention.

Referring to FIG. 1, a head-gimble assembly (HGA) 30 includes a flex suspension assembly 32 according to the present invention and a transducer head 34 attached to the flex suspension assembly. HGA 30 is employed in a disk drive (not shown) having an actuator arm (not shown) supporting HGA 30 over a magnetic disk (not shown) in the disk drive.

Transducer head 34 includes a slider 36 supporting at least one transducer 38. Transducer 38 communicates with a magnetic disk surface to write data to and read data from the magnetic disk surface.

Flex suspension assembly 32 includes a suspension assembly 40 and a flex cable 42. Suspension assembly 40 includes a base or swag plate 44, a load beam 46, and a flexure or gimble 48. The actuator arm in the disk drive includes a support arm (not shown) which is attached to base plate 44 typically by swaging base plate 44 to the support arm. Swaging or ball staking is a well-known technique.

Flex cable 42 includes conductors 50 disposed in top of a flexible sleeve 52. In one embodiment, conductors 50 are copper traces. A suitable material for flexible sleeve 52 is polyimide. Conductors 50 provide a path for electrical signals transmitted between transducers 38 and control circuitry (not shown) in the disk drive. These electrical signals represent data to be stored on or to be read from the magnetic disk of the disk drive.

Flexure 48 resiliently supports slider 36 over the magnetic disk. As the magnetic disk rotates, slider 36 is suspended above the surface of the magnetic disk, because slider 36 includes a hydrodynamic air bearing to develop and receive a lifting force from air movement resulting from the rotation of the magnetic disk. Flexure 48 allows slider 36 to pitch and roll while slider 36 follows the topography of the magnetic disk. Nevertheless, flexure 48 is rigid in the in-plane directions to maintain precision in-plane slider positioning.

Load beam 46 acts as a spring to provide a compressive load downward on slider 36 to counteract the hydrodynamic lifting force received by slider 36. Load beam 46 is resilient in the vertical direction to allow slider 36 to follow the topography of the magnetic disk but is rigid in the in-plane directions.

Load beam 46 has a plurality of portions all of a common resilient material. In one embodiment, flexure 48 is also made from the same common resilient material as load beam 46. A suitable common resilient material for load beam 46 and flexure 48 is stainless steel. Thus, one suitable method of forming suspension assembly 40 is by stamping or preferably etching the load beam from a sheet of resilient material, such as stainless steel.

Load beam 46 includes a rear pad portion 54. Base plate or swag plate 44 is typically welded onto a top surface of rear pad portion 54 to stiffen this portion of load beam 46 before load beam 46 is swaged to the support arm. Load beam 46 also includes a flexing portion 56 extending forward from a front edge of rear pad portion 54. An opening 58 is formed in flexing portion 56 to increase the flexibility of flexing portion 56.

Load beam 46 also includes a trapezoidal portion 60 which has a wide end integrally attached to flexing portion 56 and a narrow end which is connected to flexure 48. Trapezoidal portion 60 of load beam 46 comprises flanges 62 and 64 which run longitudinally along the edges of trapezoidal portion 60 thereby providing stiffening to trapezoidal portion 60 and raising the resonance frequencies of the first torsion vibration mode and the second torsion vibration mode. Flanges 62 and 64 are suitably formed by rolling the edges of trapezoidal portion 60 in a known manner. In this way, trapezoidal portion 60 is stiffer then flexing portion 56 and resists bending in response to the lifting force on slider 36 attached to suspension assembly 40 to substantially confine such bending to flexing portion 56. In addition, base plate 44 is typically welded to rear pad portion 54 to stiffen the rear pad portion to resist bending in response to the lifting force on slider 36. Thus, such bending is substantially confined to flexing portion 56 which counteracts the bending with a restoring force occurring therein when bent.

Load beam 46 also includes a front tail tack tab 66 and a rear tail tack tab 68 protruding from rear pad portion 54. Flexure 48 includes a flexure tongue 72 which is the portion of flexure 48 where slider 36 is bonded to flexure 48.

Figure 2:
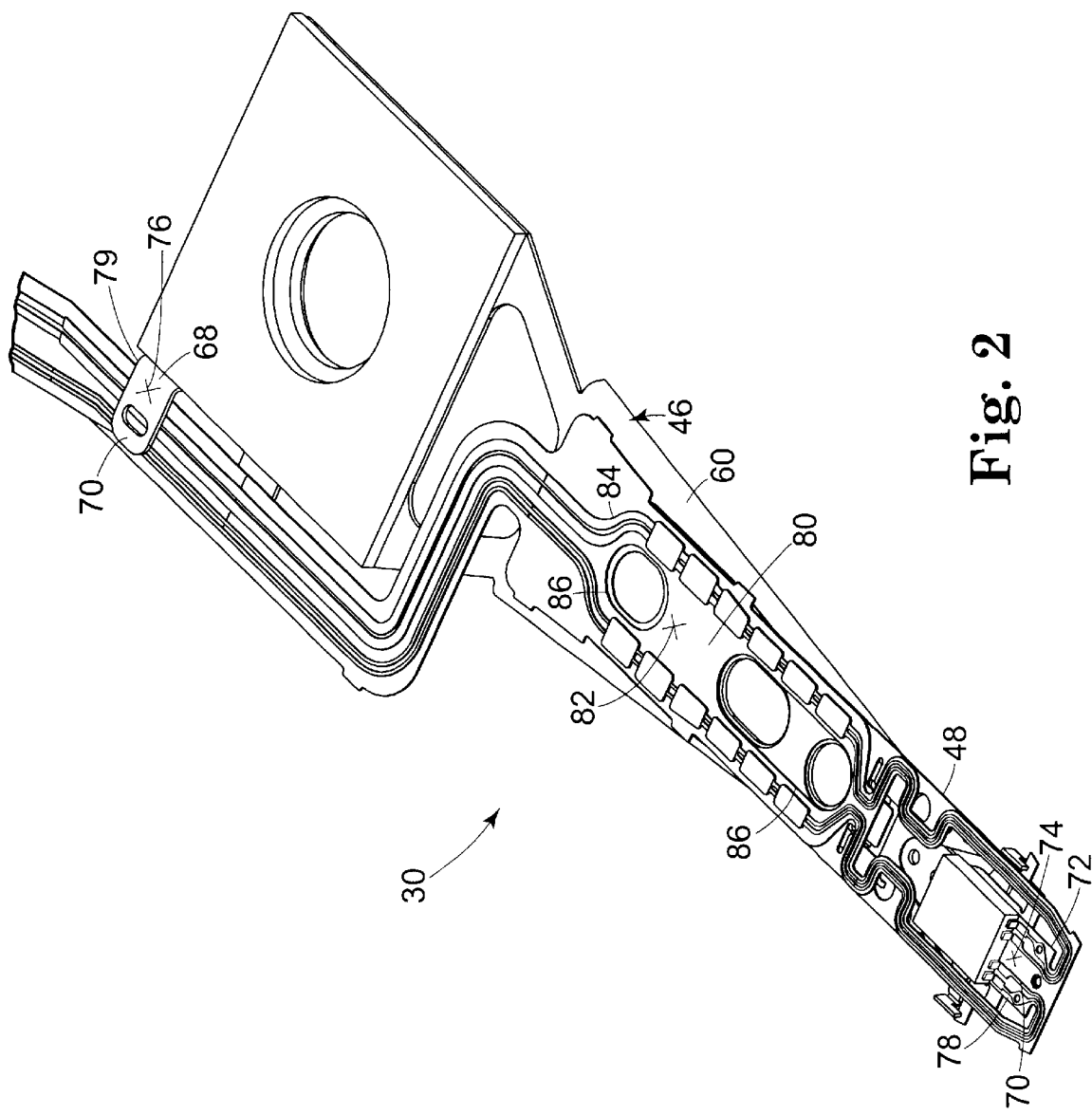
FIG. 2 is a disk side view of the HGA of FIG. 1.

Referring to FIG. 2, flex cable 42 is attached to suspension assembly 40 according to the present invention in the following manner. Flex cable 42 is typically optically aligned to suspension assembly 40. Adhesive is applied to suspension assembly 40 prior to positioning flex cable 42 onto suspension assembly 40. Specifically, structural or rigid adhesive 70 is applied to flexure tongue 72 of flexure 48 at a location 74. Structural adhesive 70 is also applied to rear tail tack tab 68 at a location 76. A dampening adhesive 80 is applied to trapezoidal portion 60 of load beam 46 at a location 82.

When flex cable 42 is optically positioned on suspension assembly 40 after structural adhesive 70 and dampening adhesive 80 have been applied to the suspension assembly, structural adhesive 70 and dampening adhesive 80 are controlled to stay on suspension assembly 40 via adhesive control features. These adhesive control features are indicated at 78 to define a flexure tongue structural adhesive area, are indicated at 79 to define a rear tail tack tab structural adhesive area, and are indicated at 84 and 86 to define a trapezoidal portion of load beam dampening adhesive area. The adhesive control features are geometric features that bound continuous contact between suspension assembly 40 (e.g., stainless steel) and flex cable 42 (e.g., polyimide). Whereever an intimate contact area exits between suspension assembly 40 and flex cable 42, structural adhesive 70 wicks to fill in the structural adhesive area defined by structural adhesive control features 78, structural adhesive 70 wicks to fill in the structural adhesive area defined by structural adhesive control features 79, and dampening adhesive 80 wicks to fill in the dampening adhesive area defined by dampening adhesive control features 84 and 86.

Proper volumes of structural adhesive 70 and dampening adhesive 80 need to be applied to prevent excessive adhesive causing bulges at the adhesive control feature boundaries, or to prevent insufficient adhesive being applied so that the adhesive area inside the adhesive control feature boundaries is not completely covered. With the proper volume of structural adhesive 70 and dampening adhesive 80 there is uniform coverage within the adhesive control feature boundaries.

Structural adhesive 70 is applied at flexure tongue 72 and at rear tail tack tab 68 because it is desirable to have a rigid joint in these areas as described above. In one example embodiment, structural adhesive 70 has a modulus of elasticity in a range from approximately 1.5 million pounds per square inch (psi) to approximately 2.5 million psi.

Dampening adhesive 80 preferably has a low modulus of elasticity to provide significant structural dampening to flex suspension assembly 32. A suitable dampening adhesive 80 is a low modulus ultra-violet (UV) cure single part epoxy. In one example embodiment, dampening adhesive has a modulus of elasticity in a range from approximately 100,000 psi to approximately 1,000,000 psi. Dampening adhesive 80 emulates a conventional constrained layer dampener without actually having a constrained layer dampener added to flex suspension assembly 32. Dampening adhesive 80 provides dampening which is particularly beneficial in disk drives because a position control system (not shown) of the disk drive must quickly locate the read/write transducer head 34 above a correct data track and maintain that positioning during operation. Therefore, the disk drive requires minimal first torsion vibration mode gain and second torsion vibration mode gain in the suspension assembly.

In one embodiment, dampening adhesive 80 provides structural dampening to flex suspension assembly 32 in high strain areas.

Figure 3:
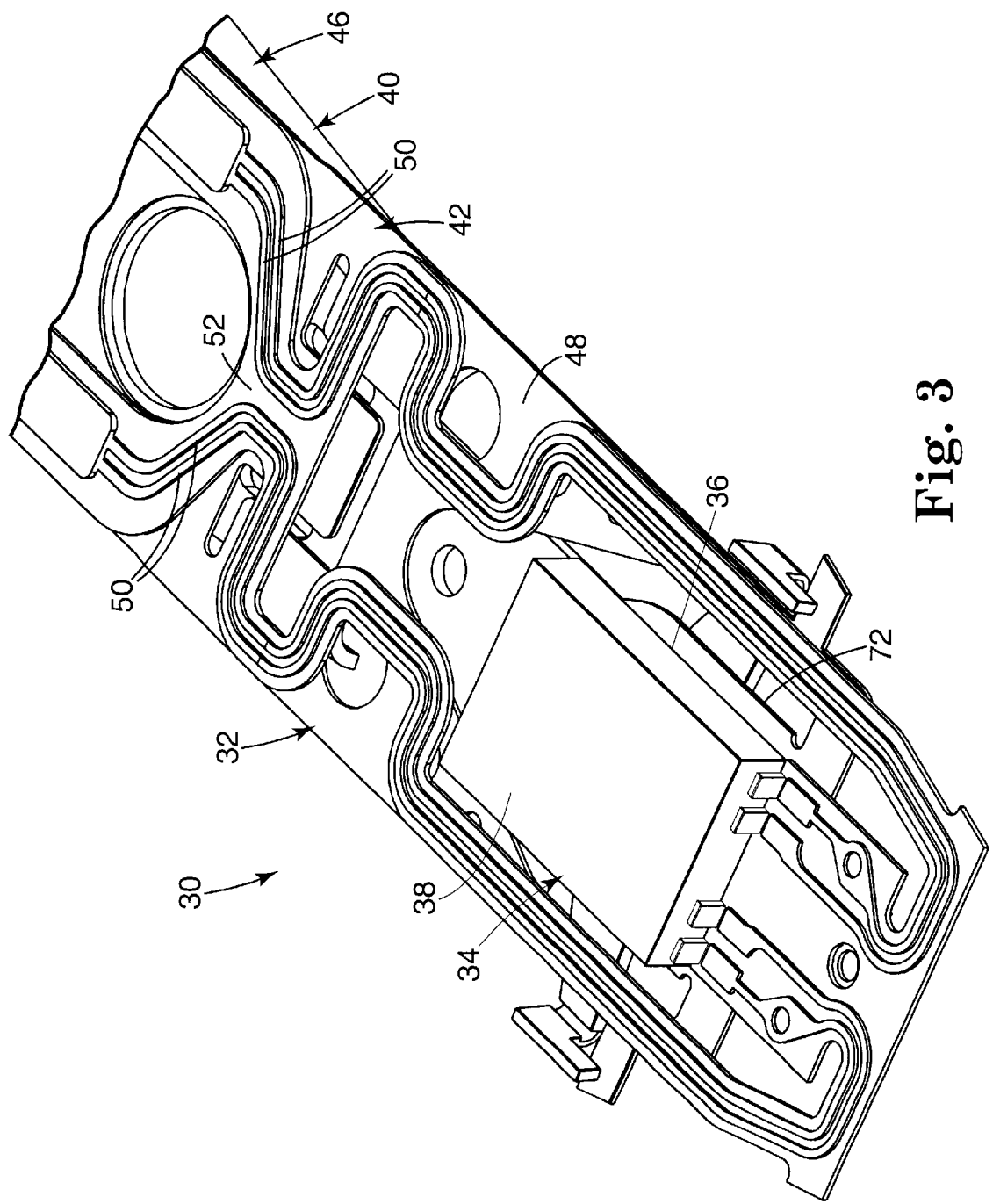
FIG. 3 is a more detailed disk side perspective view of the slider end of the HGA of FIG. 1.
Figure 4:
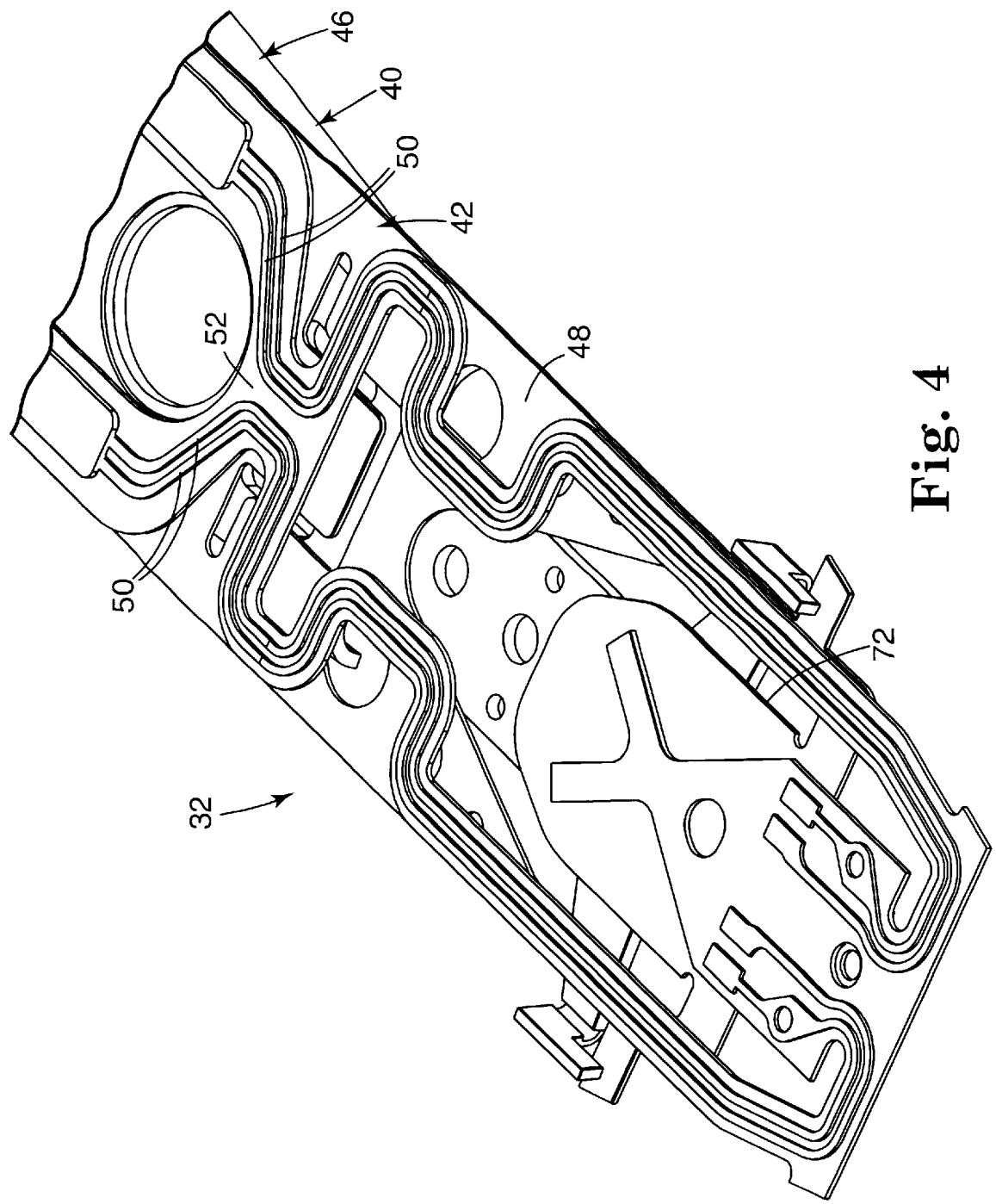
FIG. 4 is a more detailed disk side perspective view of the slider end of the flex suspension assembly of FIG. 1 without a transducer head attached thereto.
Figure 5:
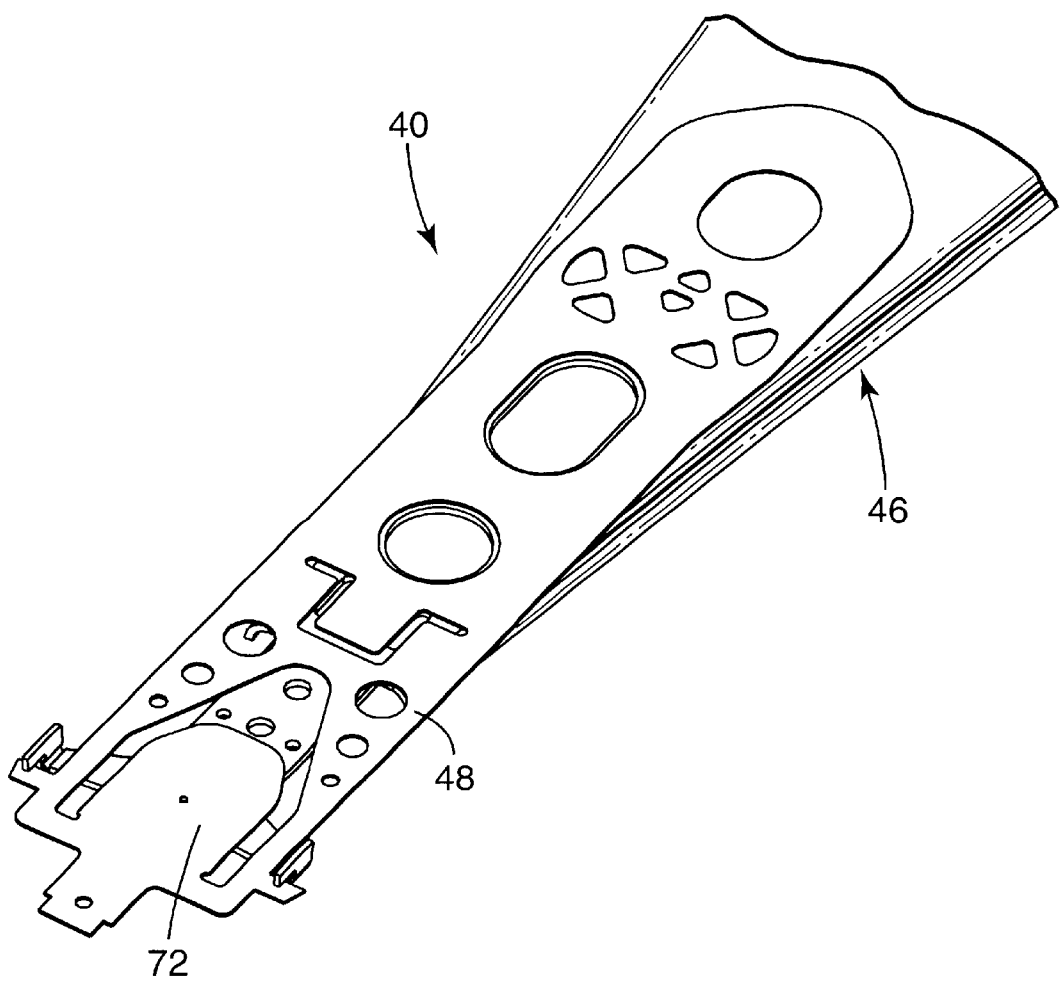
FIG. 5 is a more detailed disk side view of the slider end of a suspension assembly of the flex suspension assembly of FIG. 1 without a transducer head and without a flex cable attached thereto.

A more detailed view of the slider end of HGA 30 is illustrated in FIG. 3. A more detailed view of the slider end of flex suspension assembly 32 without transducer head 34 attached to the flex suspension assembly is illustrated in FIG. 4. A more detailed view of the slider end of suspension assembly 40 of flex suspension assembly 32 without transducer head 34 and without flex cable 42 attached to the suspension assembly is illustrated in FIG. 5. FIGS. 3–5 all provide slightly more detail illustrating the components and features of HGA 30 at the slider end of HGA 30 described above with reference to FIGS. 1 and 2.

Figure 6:
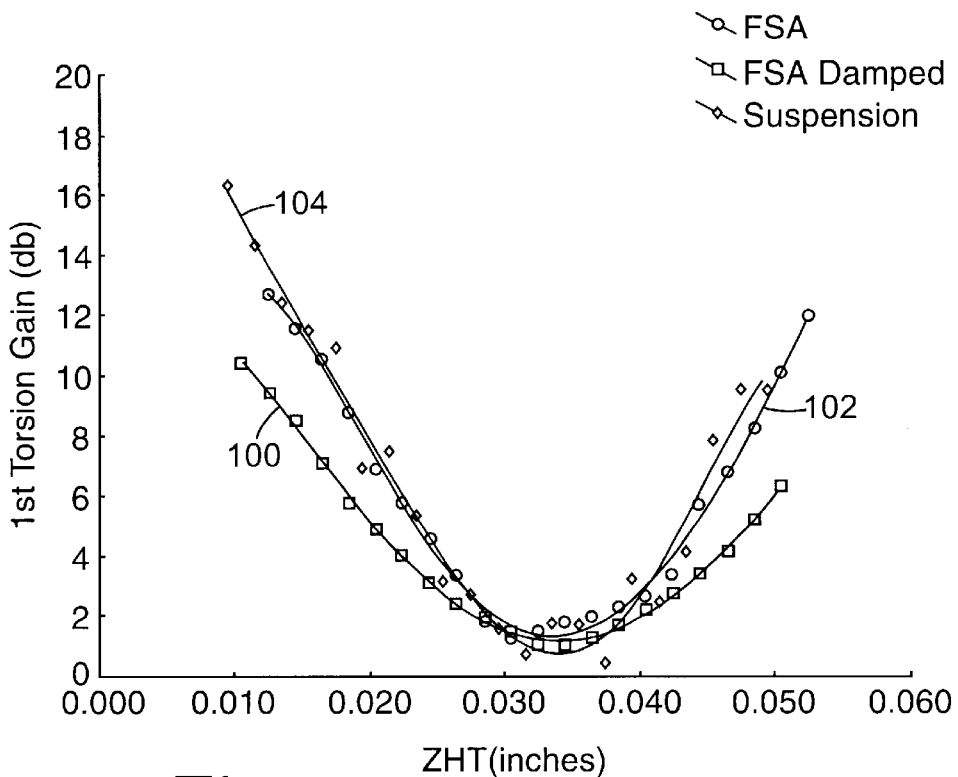
FIG. 6 is a graph of an example first torsion vibration mode gain versus Z-height for the dampened flex suspension assembly of FIG. 1, for an undampened flex suspension assembly, and for a suspension assembly without a flex cable attached thereto.

FIG. 6 provides a graph of empirical data obtained to measure the first torsion vibration mode gain versus Z-height for the dampened flex suspension assembly 32 according to the present invention, for an undampened conventional flex suspension assembly, and for a suspension assembly without a flex cable attached thereto. In FIG. 6, the first torsion vibration mode gain is plotted in decibels as a ratio of the acceleration of suspension assembly 40 at a trailing edge of slider 36 divided by the acceleration of suspension assembly 40 at the front edge of base plate 44. The acceleration measurements are obtained via velocity measurements to thereby obtain the acceleration ratio in decibels. Since 0 decibels is unity gain, positive decibels, as indicated in the graph of FIG. 6, indicates a larger magnitude of acceleration of suspension assembly 40 at the trailing edge of slider 36 than at the front edge of the base plate 44. The Z-height is defined as the distance between the disk surface and a HGA 30 clamping or mounting surface. The Z-height in FIG. 6 is indicated in inches.

In FIG. 6, the plot for the dampened flex suspension assembly 32 according to the present invention is indicated at 100. The plot for the undampened conventional flex suspension assembly is indicated at 102. The plot for the suspension assembly without the flex cable attached thereto is indicated at 104. As can be seen by the graph of FIG. 6, the first torsion vibration mode gain is significantly reduced with the dampened flex suspension assembly 32 according to the present invention with the dampening adhesive 80 being applied in the adhesive area of load beam 46 as defined by adhesive control features 84 and 86.

Figure 7:
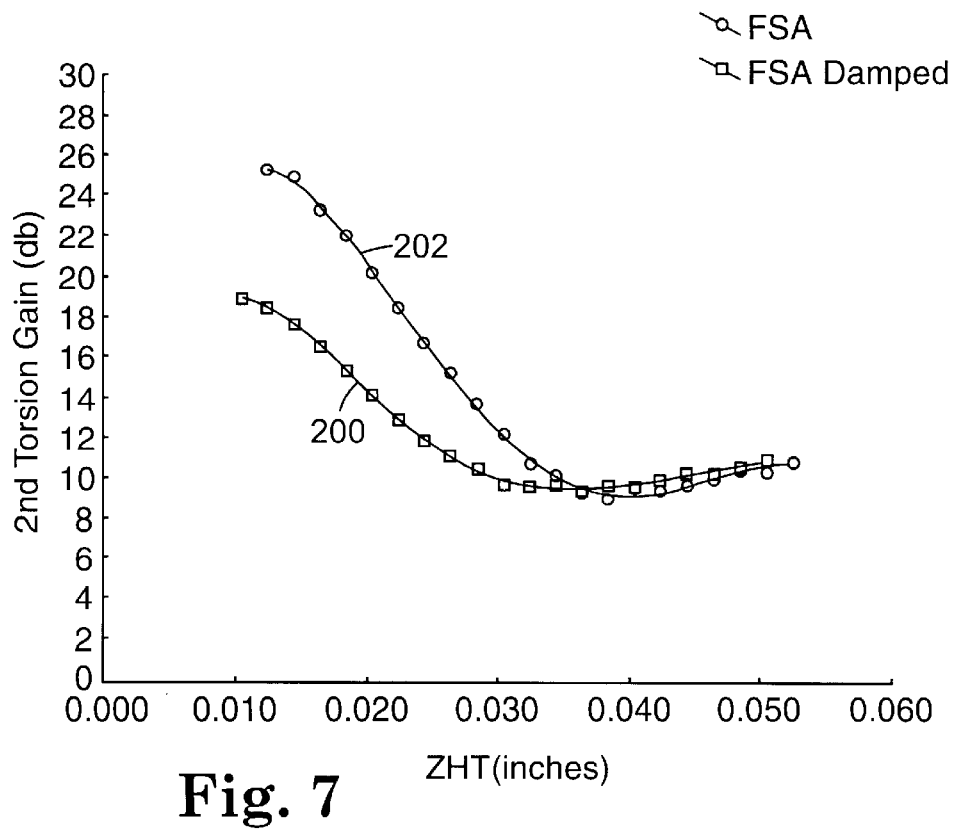
FIG. 7 is a graph illustrating an example second torsion vibration mode gain versus Z-height for the dampened flex suspension assembly of FIG. 1 and for an undampened flex suspension assembly.

FIG. 7 provides a graph of empirical data obtained to measure the second torsion vibration mode gain versus Z-height for the dampened flex suspension assembly 32 according to the present invention and for an undampened conventional flex suspension assembly. In FIG. 7, the second torsion vibration mode gain is plotted in decibels as a ratio of the acceleration of suspension assembly 40 at the trailing edge of slider 36 divided by the acceleration of suspension assembly 40 at the front edge of base plate 44. The Z-height is defined as the distance between the disk surface and the HGA 30 clamping or mounting surface. The Z-height in FIG. 7 is indicated in inches.

In FIG. 7, the plot for the dampened flex suspension assembly 32 according to the present invention is indicated at 200. The plot for the undampened conventional flex suspension assembly is indicated at 202. As can be seen by the graph of FIG. 7, the second torsion vibration mode gain is significantly reduced with the dampened flex suspension assembly 32 according to the present invention with the dampening adhesive 80 being applied in the adhesive area of load beam 46 as defined by adhesive control features 84 and 86.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A flex suspension assembly attachable to an actuator arm in a disk drive, the flex suspension assembly comprising:
    a suspension assembly adapted to resiliently support a transducer head in the disk drive;
    a flex cable having a flexible sleeve and conductors disposed in top of the flexible sleeve adapted to provide a path for electrical signals transmitted to and from the transducer head;
    a dampening adhesive applied between the flex cable and the suspension assembly in at least one dampening adhesive area defined by dampening adhesive control features that bound continuous contact between the flex cable and the suspension assembly, the dampening adhesive having a low modulus of elasticity to provide structural dampening to the flex suspension assembly; and
    a structural adhesive applied between the flex cable and the suspension assembly in at least one structural adhesive area defined by structural adhesive control features that bound continuous contact between the flex cable and the suspension assembly, the structural adhesive having a high modulus of elasticity to provide at least one rigid joint between the flex cable and the suspension assembly in the at least one structural adhesive area.

2. The flex suspension assembly of claim 1, wherein the suspension assembly includes:
    a base plate adapted to attach to the actuator arm in the disk drive;
    a load beam attached to the base plate; and
    a flexure attached to the load beam and adapted to resiliently support the transducer head.

3. The flex suspension assembly of claim 2 wherein the at least one dampening adhesive area is located between the flex cable and the load beam.

4. The flex suspension assembly of claim 2 wherein the at least one structural adhesive area is located between the flex cable and the flexure.

5. The flex suspension assembly of claim 2 wherein the load beam includes a tail tack tab, and wherein the at least one structural adhesive area is located between the flex cable and the tail tack tab.

6. The flex suspension assembly of claim 1 wherein the dampening adhesive provides structural dampening to the flex suspension assembly in high strain areas.

7. The flex suspension assembly of claim 1 wherein the dampening adhesive has a modulus of elasticity in a range from approximately 100,000 pounds per square inch (psi) to approximately 1,000,000 psi.

8. The flex suspension assembly of claim 1 wherein the structural adhesive has a modulus of elasticity in a range from approximately 1.5 million pounds per square inch (psi) to approximately 2.5 million psi.

9. The flex suspension assembly of claim 1 wherein the dampening adhesive provides structural dampening to the flex suspension assembly to significantly reduce a first torsion vibration mode gain of the flex suspension assembly.

10. The flex suspension assembly of claim 1 wherein the dampening adhesive provides structural dampening to the flex suspension assembly to significantly reduce a second torsion vibration mode gain of the flex suspension assembly.

11. A method of forming a flex suspension assembly which is attachable to an actuator arm in a disk drive, the method comprising:
    providing a suspension assembly adapted to resiliently support a transducer head in the disk drive;
    providing a flex cable having a flexible sleeve and conductors disposed in top of the flexible sleeve adapted to provide a path for electrical signals transmitted to and from the transducer head;
    applying a dampening adhesive between the flex cable and the suspension assembly in at least one dampening adhesive area defined by dampening adhesive control features that bound continuous contact between the flex cable and the suspension assembly, the dampening adhesive having a low modulus of elasticity to provide structural dampening to the flex suspension assembly; and
    applying a structural adhesive between the flex cable and the suspension assembly in at least one structural adhesive area defined by structural adhesive control features that bound continuous contact between the flex cable and the suspension assembly, the structural adhesive having a high modulus of elasticity to provide at least one rigid joint between the flex cable and the suspension assembly in the at least one structural adhesive area.

12. The method of claim 11, wherein the suspension assembly includes a base plate adapted to attach to the actuator arm in the disk drive, a load beam attached to the base plate, and a flexure attached to the load beam and adapted to resiliently support the transducer head, wherein the applying step comprises:
    applying the dampening adhesive between the flex cable and the load beam.

13. The method of claim 11, wherein the suspension assembly includes a base plate adapted to attach to the actuator arm in the disk drive, a load beam attached to the base plate, and a flexure attached to the load beam and adapted to resiliently support the transducer head, wherein the applying of the structural adhesive step comprises:

applying the structural adhesive between the flex cable and the flexure.

14. The method of claim 11, wherein the suspension assembly includes a base plate adapted to attach to the actuator arm in the disk drive, a load beam attached to the base plate and having a tail tack tab, and a flexure attached to the load beam and adapted to resiliently support the transducer head, wherein the applying of the structural adhesive step comprises:

applying the structural adhesive between the flex cable and the tail tack tab.

15. The method of claim 11 wherein the dampening adhesive provides structural dampening to the flex suspension assembly in high strain areas.

16. The method of claim 11 wherein the dampening adhesive has a modulus of elasticity in a range from approximately 100,000 pounds per square inch (psi) to approximately 1,000,000 psi.

17. The method of claim 11 wherein the structural adhesive has a modulus of elasticity in a range from approximately 1.5 million pounds per square inch (psi) to approximately 2.5 million psi.

18. The method of claim 11 wherein the dampening adhesive provides structural dampening to the flex suspension assembly to significantly reduce a first torsion vibration mode gain of the flex suspension assembly.

19. The method of claim 11 wherein the dampening adhesive provides structural dampening to the flex suspension assembly to significantly reduce a second torsion vibration mode gain of the flex suspension assembly.

* * * * *